United States Patent

[11] 3,631,385

| [72] | Inventor | Daniel Silverman<br>Tulsa, Okla. |
|---|---|---|
| [21] | Appl. No. | 879,218 |
| [22] | Filed | Nov. 24, 1969 |
| [45] | Patented | Dec. 28, 1971 |
| [73] | Assignee | Amoco Production Company |

[54] HOLOGRAPHIC WELL-LOGGING SYSTEM
2 Claims, 10 Drawing Figs.

[52] U.S. Cl. .................................................... 340/18,
340/15.5
[51] Int. Cl. .................................................... G01v 1/28,
G01v 1/34
[50] Field of Search ........................................... 340/15.5
DS, 15.5, 18; 181/.5

[56] References Cited
UNITED STATES PATENTS

| 3,400,363 | 9/1968 | Silverman ................. | 340/3 |
| 3,484,740 | 12/1969 | Cook ......................... | 340/15.5 |
| 3,515,237 | 6/1970 | Smith, Jr. et al. ............ | 181/.5 |
| 3,517,768 | 6/1970 | Straus ......................... | 340/18 |
| 3,521,154 | 6/1970 | Maricelli ..................... | 340/18 |

Primary Examiner—Rodney D. Bennett, Jr.
Assistant Examiner—N. Moskowitz
Attorneys—Paul F. Hawley and Newell Pottorf ABSTRACT: By an adaptation of elastic-wave holography, data are recorded from which a hologram can be prepared for reconstructing an image of a well wall to show fractures, vugs, dips, stratification and like features. An expanse of well wall is irradiated with high-frequency, coherent sound waves, and the interference pattern of the irradiating sonic energy and that returned from the wall expanse to a detection area is recorded to form an acoustic holograms at the detection area. By a combination of axial and rotary-scanning motions of the logging apparatus, a continuous hologram is obtained suitable for reconstruction to view as much as desired of the entire well-wall area.

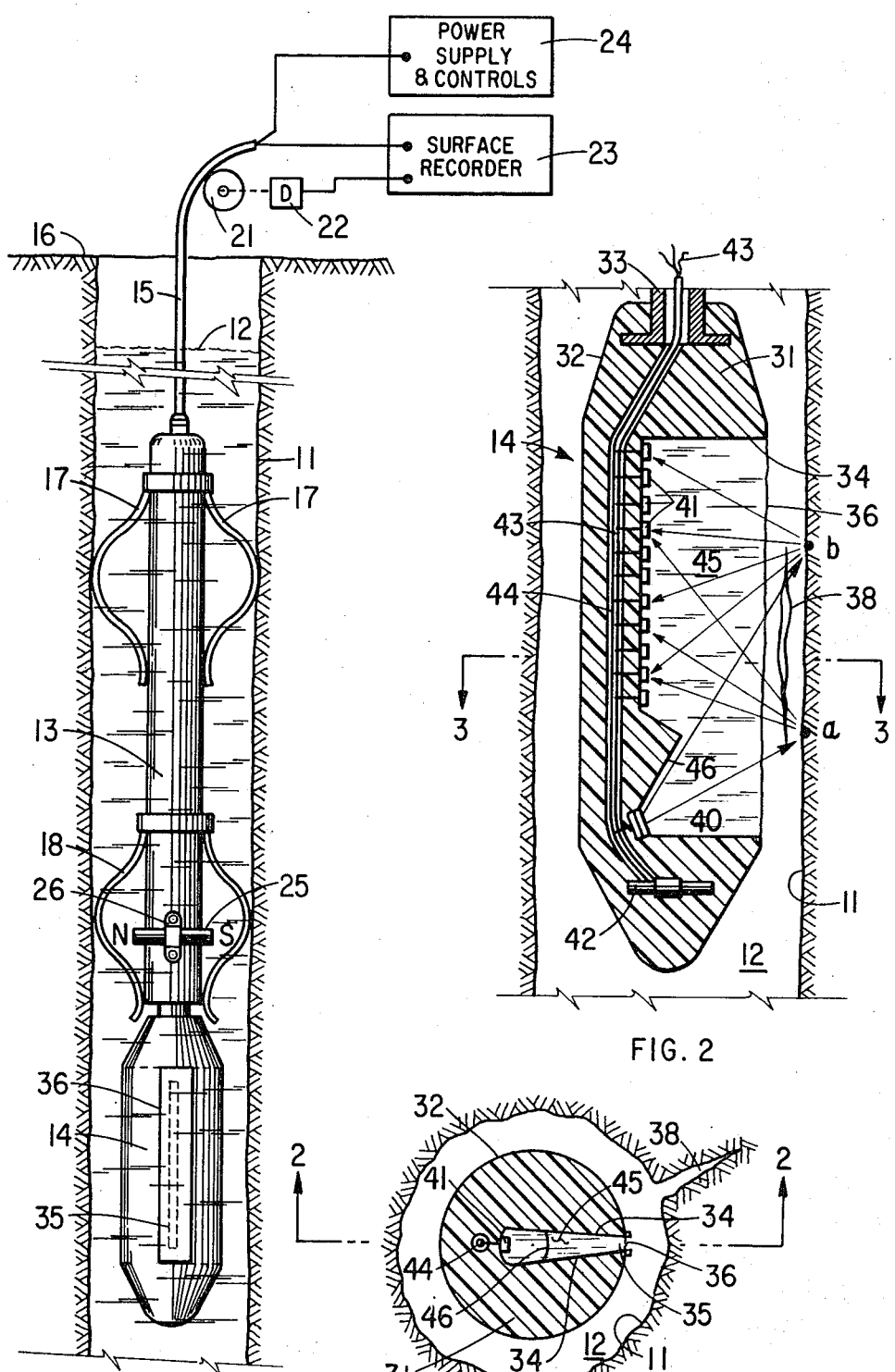

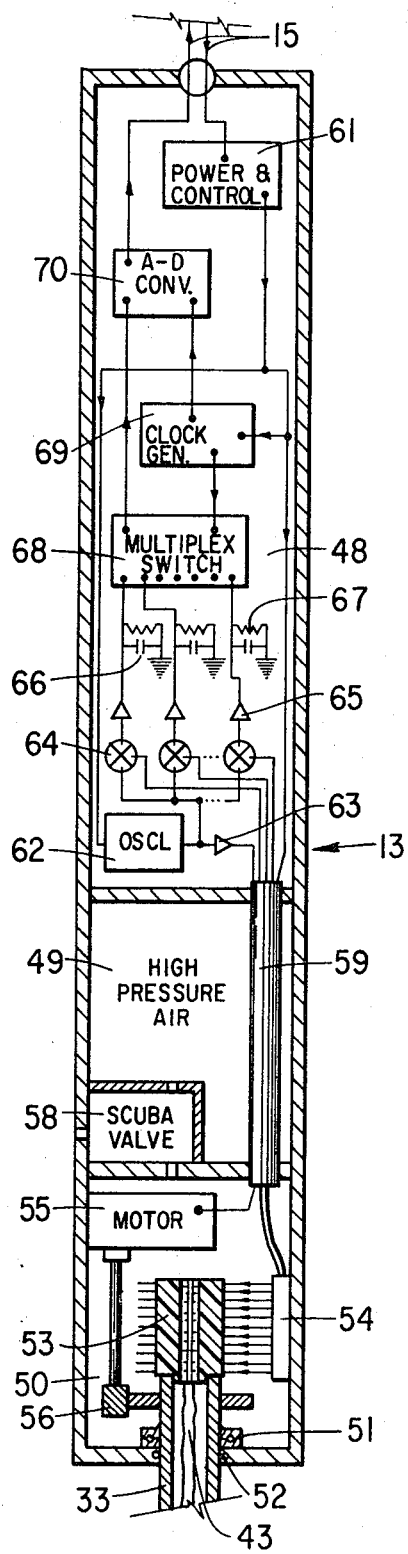
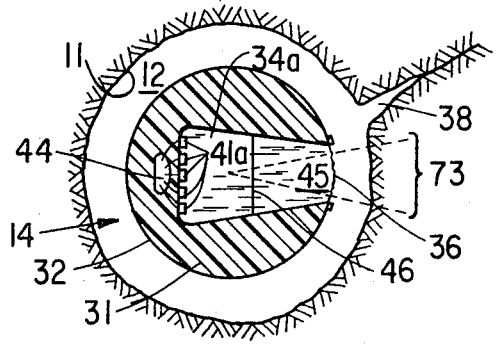
FIG. 5
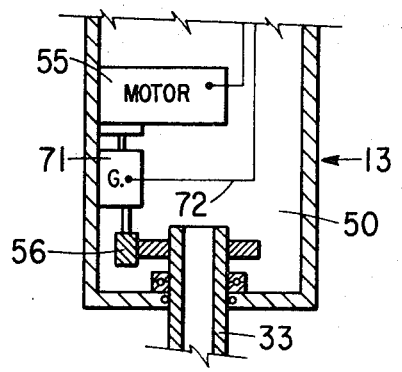
FIG. 6
FIG. 4
INVENTOR.
DANIEL SILVERMAN
BY Newell Potter
ATTORNEY

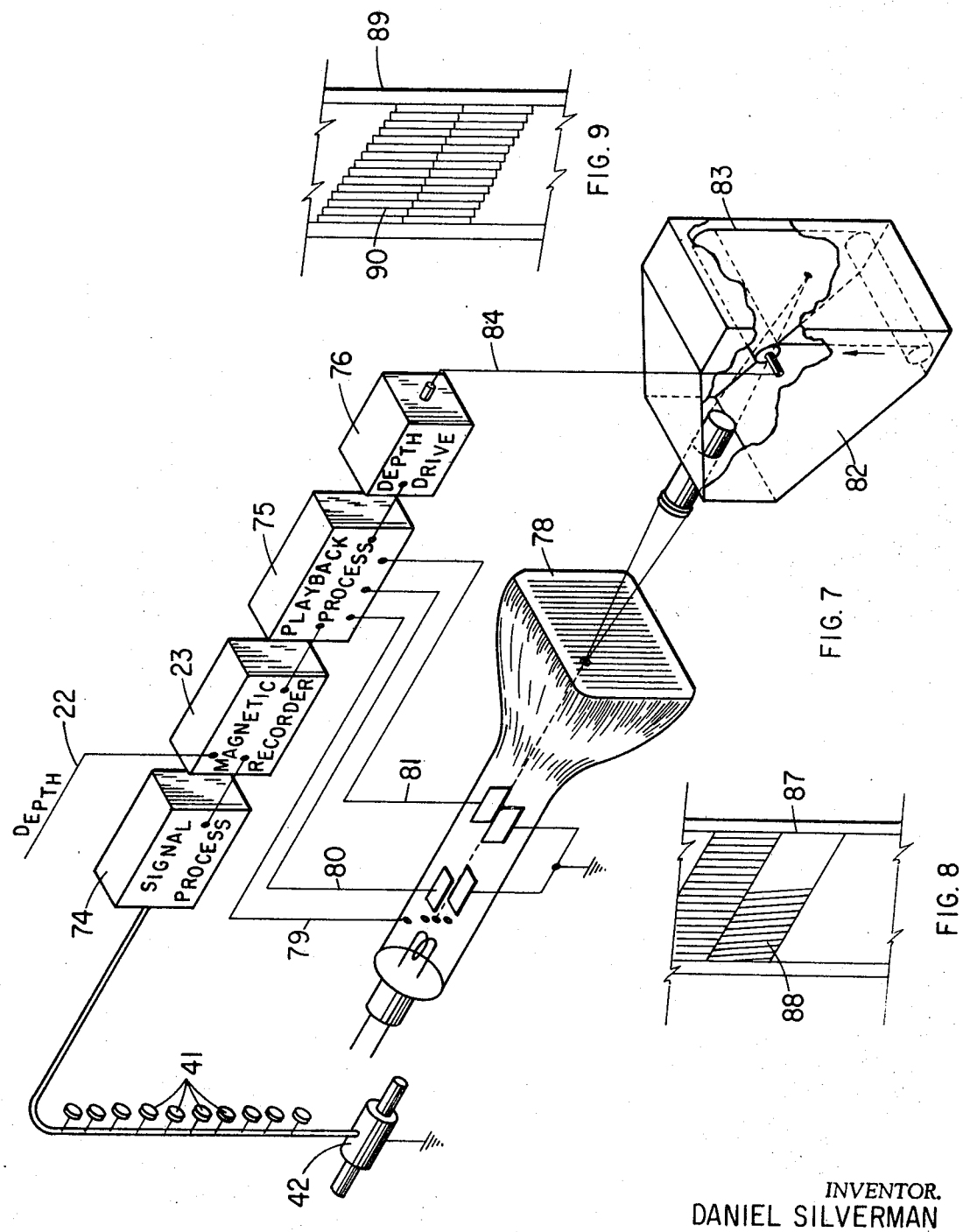

3,631,385

HOLOGRAPHIC WELL-LOGGING SYSTEM

BACKGROUND OF THE INVENTION

Field of the Invention

This invention relates to logging wells and is directed particularly to logging wells to obtain data regarding the surface characteristics of the well wall. More specifically, the invention is directed to a method and apparatus utilizing the principles of elastic-wave holography in well-logging to provide data from which can be obtained a visual representation of well-wall surface features such as fractures, vugs, stratification, dip, and the like.

In response to the needs of the oil and gas exploration and producing and of other mineral industries, a very large number of logging instruments and techniques have been suggested or developed for making borehole measurements of rocks and fluid properties. The great majority of these, however, respond to the average value of some property over a finite size of surface or volume. These measurements are useful and are used for many purposes, but for uses where resolving power for small details is of importance, they are severely limited. For example, until rather recently the only really satisfactory way of obtaining information about small borehole wall features such as fissures, fractures, vugs, and the like, has been by photographic or television techniques utilizing a deep well camera or the like. This has obvious limitations as regards the need for transparent wellbore fluids.

More recently, a tool-utilizing acoustic waves of ultrasonic frequencies, generally known as the Borehole Televiewer, has been introduced with some success. See, for example, the description of this tool in the *Oil and Gas Journal* issue of Dec. 2, 1968, Volume 66, No. 49, pp. 42, 43. Although this tool successfully avoids the problem of well-fluid transparency, the indications produced vary considerably depending upon the sensitivity employed in the detecting and recording systems, and the indications produced do not necessarily have unique interpretations. In view of this, it is a primary object of the present invention to utilize sonic waves for investigating surface features of wellbore walls in such a way that the indications obtained are essentially independent of the instrument settings and correspond more closely to a visual representation of the wall surface.

SUMMARY OF THE INVENTION

This and other objects are accomplished in accordance with my invention by what may be termed an adaptation of elastic-wave holography. In place of the prior art discrete acoustic pulses, the wall of a well is irradiated with coherent continuous high-frequency sonic energy, some of which is scattered or reflected in various directions, in accordance with the surface features of the wall, and returns to a detection area spaced from the wall and substantially parallel thereto. By analogy to optical holography, an interference wave pattern over the detection area is created by combining the detected scattered sonic energy with waveform energy taken directly from the source in either acoustical or electrical form, and the resulting pattern in the form of corresponding electrical waves is recorded. As this recorded pattern is directly analogous to an optical hologram, reconstruction of a visual image of the irradiated wall portion can be accomplished by any of several reconstruction techniques. For example, translation of the interference pattern into a corresponding pattern of variable density on photographic film and illumination of the variable-density pattern with coherent light produce directly a visible image of the wall surface. Alternatively, by Fourier transformation programs, a digital computer can prepare a variable-density printout analogous to the coherent-light reconstruction image.

In order to cover an appreciable area of well-wall surface, the well instrument employs rotation and axial motion of the irradiating and detecting transducers, in combination with sequential scanning and recording of transducer-array outputs, to obtain holographic data of the extended well-wall surface. In accordance with one specific embodiment of the invention, a linear detector array in combination with a narrow scanning aperture provides the desired resolution, while in another embodiment of two-dimensional detector array provides the necessary two-dimensional resolution for wall features. This will be better understood by the following detailed description made with reference to the accompanying drawings.

BRIEF DESCRIPTION OF THE DRAWINGS

FIG. 1 is an elevation view of logging sonde embodying the invention in a borehole in the earth shown in cross section;

FIG. 2 is a vertical cross section through the lower, rotatable portion of the logging sonde;

FIG. 3 is a horizontal cross section through the scanning head of FIG. 2;

FIG. 4 is a diagrammatic, vertical cross section through the upper portion of the logging sonde;

FIG. 5 is a horizontal cross section similar to FIG. 3 of an alternative embodiment of the invention;

FIG. 6 is a cross section of a part of the instrument portion shown in FIG. 4 as modified for use with the embodiment of FIG. 5;

FIG. 7 is a partial wiring diagram and schematic representation of apparatus for translating the recorded data to a hologram;

FIGS. 8 and 9 are representations of the hologram film produced respectively by the embodiments of FIGS. 3 and 5.

DESCRIPTION OF THE PREFERRED EMBODIMENTS

Figure 10:
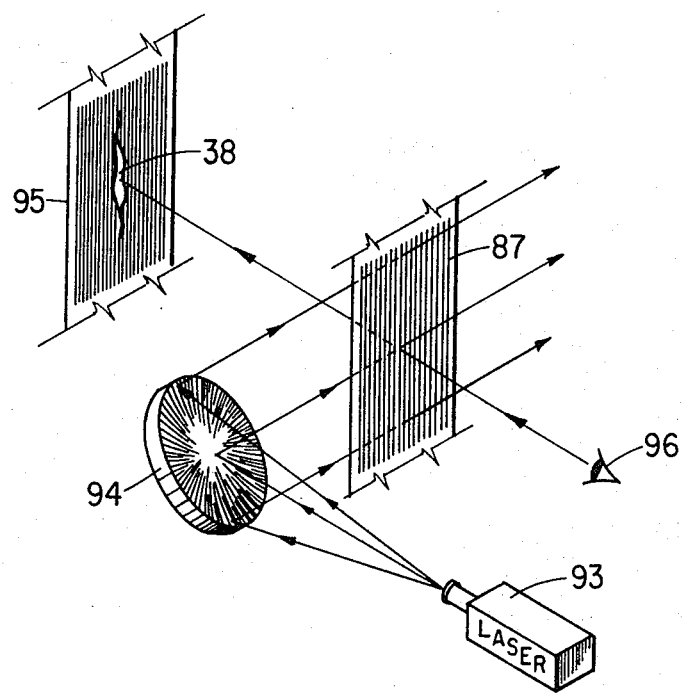
FIG. 10 illustrates diagrammatically the reconstruction of a view of a portion of a borehole wall form a recorded hologram.

Referring now to the drawings in detail and in particular to FIG. 1, a borehole 11 is shown containing a body of liquid 12 in which is immersed a logging sonde consisting of an upper instrument housing 13 and a lower rotating or scanning head 14. A supporting cable 15 containing insulated electrical conductors extends from the logging sonde to ground surface 16 where it passes over a depth-measuring wheel 21 actuating a depth counter 22 which records depth indications on a surface recorder 23 connected to an appropriate one or more of the conductors of cable 15. Also at surface 16 is a power supply and control unit 24 likewise connected to one or more conductors of cable 15, to supply power to the subsurface units and control their operation. Preferably, the upper portion 13 of the logging sonde is centralized near the center of borehole 11 by bow springs 17 and 18. If a cased well is to be logged, a permanent magnet 25 may be attached to the outside of housing 13 by a bracket 26.

The rotating or scanning head 14 is shown in more detail in FIGS. 2 and 3. It comprises a generally cylindrical body, somewhat streamlined at the ends to aid passage through the wellbore 11, made of a gas-permeable acoustic-absorbing or sound-insulating medium, such as a molded gas-permeable foamed plastic 31, surrounded by a liquid-impermeable shell or skin 32 and attached to or molded around a flanged tubular supporting member 33. Extending part way across a diameter of the cylindrical body is a longitudinal slot or cavity 34 having a narrow opening 35 facing the wall of well 11, which opening is preferably covered by a thin flexible diaphragm 36. Attached to or imbedded within slot cavity 34 on its wall opposite to opening 35 are a vibration or sound source transmitter 40 and an array of receiving transducers 41. The transmitter 40 and receivers 41 can be any of a number of commercial types of sonic transducers. Also imbedded within plastic body 31 preferably near its lower end is a magnetic flux-gate compass element 42 comprising an elongated highly magnetically permeable core surrounded by an electrical coil-winding.

In an uncased hole, the signal provided by the flux-gate compass is a function of azimuth relative to the magnetic field of the earth. For use inside casing, where the earth's field is shielded, the magnet 25 on upper housing 13 provides a reference field, so that the flux-gate compass 42 can indicate azimuth of the rotating portion of the sonde with respect to the stationary upper portion.

One of a plurality of electrical conductors 43 extends from each of transducers 40 and 41 as well as from the compass element 42 along a passage or conduit 44 extending lengthwise through plastic body 31 and upwardly through tubular member 33. Slot cavity 34 is filled with a body of liquid 45 preferably closely matching in acoustic impedance the liquid 12 filling wellbore 11. A projection 46 of the plastic material 31 into cavity 34 between source 40 and detectors 41 reduces direct transmission of sonic energy between them.

Referring now to FIG. 4, the upper portion 13 of the logging sonde generally comprises three compartments, an upper compartment 48, a middle compartment 49, and a lower compartment 50. Projecting upwardly into compartment 50 is the tubular member 33, to which the lower sonde portion 14 is attached, a bearing 51 ad a seal ring 52 allowing rotation of the tubular member 33 and scanning head 14 relative to upper instrument housing 13 while excluding well fluids from entering housing compartment 50. Secured to the upper end of member 33 is a multiple slipring assembly 53 with a central passage into which the various electrical leads 43 from the scanning head 14 are brought to terminate with the various respective sliprings. A stationary brush structure 54 attached to the wall of compartment 50 provides electrical continuity in the electrical circuits between the various elements of the rotating head 14 and those in the upper compartment 48. Also mounted within compartment 50 is a constant-speed motor 55 provided with gearing 56 for rotating lower scanning head 14 relative to the instrument housing 13.

The middle compartment 49 comprises generally a container for high-pressure air or gas, and a control-valve assembly 58 for admitting this gas into the compartment 50 and thence through the central openings of slipring assembly 53 and tubular member 33 into the permeable plastic sound-absorbing body 31 of rotating head 14. This valve assembly is of a generally known type, such as that used in self-contained underwater-breathing apparatus, and functions to maintain the gas or air pressure within compartment 50 and within permeable medium 31 in substantial balance with the hydrostatic pressure of outside liquid medium 12, by admitting air from compartment 49 into compartment 50 when the logging sonde is descending through liquid 12 and exhausting it from compartment 50 to the outside of housing 13 when the logging sonde is being raised. The sound-absorbing and insulating properties of plastic body 31 are thus maintained during logging operations when they might otherwise be lost by crushing and liquid invasion of plastic 31 by the well liquids 12. Also, the pressure on enclosed liquid medium 45 is balanced with the outside well pressure so that diaphragm 36 is unstressed and transmits sonic energy freely. A tubular conduit 59 sealed to the ends of compartment 49 and containing a pressure-sealing insulating medium through which the various electrical conductors pass provides electrical connection paths between upper compartment 48 and lower compartment 50.

Some of the various elements of the control and data-processing system contained within upper compartment 48 are shown in block diagram form for the reason that each is generally well known in the well-logging and data-processing arts. Thus, a power and control signal unit 61 receives electrical power and control signals over a conductor of cable 15 from surface unit 24 (FIG. 1). Unit 61 then supplies energizing power and signals to an oscillator 62 of very constant frequency, the output of which is amplified by an amplifier 63 and drives the sonic source transducer 40 to generate coherent sonic waves. An insulated lead from the output of each of the receiving transducers 41 is connected to a corresponding adder circuit 64, where the receiver output is combined with a reference signal from oscillator 62. Each adder output then goes to a peak-voltage-detecting circuit comprising a series rectifier 65, and a shunt-integrating condenser 66 and resistance 67 in parallel, and thence to one of the multiple input terminals of multiplexing switch 68. A clock-pulse generator 69 controls the switching action of multiplexer 68 as well as the operation of analog-digital converter 70, which then transmits over cable 15 to surface recorder 23 sequential signals representing the parallel input signals from transducers 41 to multiplexer 68. Included in these transmitted signals also is a signal representative of the orientation of compass unit 42, and thus of the rotating head 14 with respect to the horizontal component of the earth's magnetic field in well 11 (or of magnet 25 in a cased well).

In operation, with coherent sonic energy typically of 500 to 2,500 kilohertz being continuously emitted by transducer 40 and received by the receiver array 41, the logging sonde is moved continuously along the wellbore 11 while the head 14 rotates. Preferably, the raising or lowering of the instrument and the speed of rotation of scanning head 14 are so related that the instrument movement along the wellbore during one revolution of the head 14 is equal to or less, but ordinarily not greater, than the length of the slot 35. Sonic energy emitted by the source 40 is transmitted by liquid 45 outwardly through aperture 35 and diaphragm 36 into the surrounding liquid medium 12 and thence to the wall of wellbore 11, from all points of which it is returned to receiving detector array 41. Due to the shielding and absorbing nature of the air-filled plastic foam medium 31, sonic energy radiated by the source 40 and returned from the wall 11 in any other direction than that passing through the narrow aperture 35 is attenuated, absorbed, or otherwise prevented form reaching detectors 41. As is required in holography, however, all points of a vertical strip of the wellbore facing aperture 35 are simultaneously irradiated by the source 40, and each point on the wall returns energy to the entire array of receivers 41.

Taking the representative point $a$ in FIG. 2, the ray paths of energy received from transmitter 40 and returning to several of the receivers 41 are shown. Similarly, there are shown the corresponding ray paths for another representative point $b$, so it can be seen that the detected wave form at each individual receiver 41 is the resultant of all waves returned from the entire irradiated strip of wellbore 11. When the detecting array consists of a single line of detectors 41, it is the width of the aperture 35 which provides resolution in azimuth around the wellbore circumference. This means also, that in order to scan the entire surface of the wellbore, the speed of switching by unit 68 and of rotation of the head 14 must be coordinated so that the angle of head rotation is equal to or less than that subtended by the slit 35 during each switching cycle. Otherwise, a wall feature such as a fracture opening 38 might be missed by falling between two successive multiplexing or switching cycles. Clearly also, the width of slit 35 must be limited to about the size of the minumum wall feature that is to be observed.

A modification of the scanning head 14 not requiring the narrow slit 35 for azimuth resolution is shown in FIG. 5. In vertical section this generally resembles the section of FIG. 2, but instead of a single vertical line of detectors 41, the individual detectors 41a are arranged in a plurality of vertical lines forming an areal or two-dimensional detector array. In this instance, the opening of the cavity 34a can be substantially larger than the slit 35, for example exposing for observation at any instant an area of the well wall equal in width to the expanse 73 and in length to the length of the cavity 34a. Also, it is preferred that scanning head 14 remain stationary during each multiplexing or switching cycle of the array of detectors 41a and that a complete rotation of the scanning head 14 take place in an integral number of steps.

This can be accomplished in any of several ways, for example, as shown in FIG. 6, where an intermittent gear device 71, which may include a mechanism such as a Geneva wheel, changes the constant rotation of motor 55 to intermittent rotation of the gearing 56 which rotates head 14. The intermittent gear device 71 may also transmit electrical signals over a lead 72 for recording or for synchronizing the cycling of multiplex switch 68 with it. In this embodiment also, the rate of vertical movement of the logging sonde through well 11 is correlated with the time of rotation of the scanning head 14 so that during one complete stepwise revolution of the head the vertical motion does not exceed the length of the cavity 34a. For the best resolution of wall details, the logging sonde also should remain stationary and be moved vertically in a stepwise manner only at the end of each revolution of head 14. Since the multiplexing cycle of switch 68 can be very short, however, of the order of a few milliseconds, typically, a relatively slow vertical movement of the sonde can be tolerated.

In FIG. 7 is shown diagrammatically one form of apparatus for translating the observed or recorded data from the logging sonde into a hologram suitable for reconstructing an image of the well wall. The respective signals of receiving transducers 41 and of orientation detector 42, shown as processed by the signal-processing system 74 (which may be considered to represent the mixing and multiplexing functions of the apparatus in compartment 48) and recorded by the magnetic recorder 23, are played back by the playback-processing unit 75 which also furnishes signals to a depth-drive unit 76 in accordance with the information originating in depth counter 22. Unit 75 essentially reverses the signal-processing of unit 74 so that the successive signal amplitudes of individual detectors 41, as modified by the reference signals from oscillator 62 (FIG. 4), are applied in succession through a lead 79 to the beam-intensity control electrode of a cathode-ray tube 78. Playback unit 75 also impresses on a lead 80 connected to the vertical-deflection electrodes of tube 78 a signal from switching unit 68 proportional to the vertical position of each individual transducing receiver 41 in the receiver array. While a lead 81 connected to the horizontal-deflection electrodes of tube 78 carries a voltage proportional to the angle of rotation of scanning head 14 as it revolves on the well axis, the unit 42 providing a synchronizing impulse which originates a new horizontal scan for each complete revolution of the head 14. A camera unit 82 is positioned to translate the varying-intensity pattern on the face of tuber 78 into a corresponding exposure pattern of a filmstrip 83 which, by a driving connection 84 to the depth-drive unit 76, is moved in accordance with the depth of the logging sonde in well 11.

FIGS. 8 and 9 show the appearance of typical hologram patterns on segments of the filmstrip 83 after photographic processing. The hologram segment 87 of FIG. 8 corresponds to that produced by the narrow-gap scanning head 14 of FIG. 3, each vertical trace 88 corresponding to one scan over the receiving transducer array 41, all of the scans corresponding to one rotation of the scanning head 14 forming a band extending obliquely across the filmstrip 87. That is, each oblique band of side-by-side individual traces corresponds to one rotation of the head 14 while the logging sonde moves vertically by about the length of the slot 35, the film 83 being moved a proportional distance in camera 82 by the depth-drive unit 76 and mechanical connection 84.

Similarly, the hologram segment 89 of FIG. 9 corresponds to recording with the scanning-head embodiment of FIG. 5 each longitudinal block 90 corresponding to recording the hologram of a strip 71 of the well wall with the head 14 momentarily stationary, neglecting the effect of any slow vertical movement of the sonde during the multiplexing cycle. As with FIG. 8, the total exposed segments in the side-by-side array extending obliquely across the width of filmstrip segment 89 correspond to one revolution to the scanning head 14 around the axis of wellbore 11 using the intermittent drive mechanism of FIG. 6.

One way of reconstructing a visible image from the hologram 87 or 89 is shown diagrammatically in FIG. 10. For example, monochromatic light from a source such as a laser 93, converted to a parallel beam of coherent radiation by a paraboloidal reflector 94 is directed through the hologram 87. A reconstructed image enough of a vertical segment of the wellbore then appears as a flat surface in the position shown in FIG. 10, where it may be viewed or photographed from eyepoint 96 for interpretation mixer the recorded patterns. Generally, the reconstruction image 95 corresponds to a photograph of a cylindrical segment of the wellbore surface over a given vertical interval, the cylindrical photograph being slit vertically along a line where the orientation device 42 produces its orienting impulse, and laid flat.

It will be clear that, while I show in the sonde means for sequentially sampling the combined sums of the individual transducer outputs and a reference electrical signal derived from the oscillator, and of sequentially transmitting these samples to the surface recorder, other equivalent means can be use. For example, if there are enough conductors available in the support member 15, part or all of the transducers 41 can have their outputs simultaneously transmitted to the surface. Also, instead of converting the sinusoidal signals from the mixer to digital signals for transmission to the surface, part or all of the processing carried on at the surface can be performed in the sonde, to the end that simpler, shorter signals can be transmitted to the surface. Since, for optimum operation, the rotating head should be stationary while the scanning and transmitting of signals from each of the transducers in the array is completed, any means to shorten this time of scanning will effectively simplify and speed up the logging operations.

While the invention has been described and illustrated for use in the inspection of well bore walls, it will clearly also be useful for remote inspections in many other environments wherever elastic waves may be transmitted to and received from a reflecting surface.

I claim:
1. Apparatus for logging wells comprising:
   a sonde adapted to be moved through a well,
   a source of coherent sonic waves carried by said sonde and adapted to irradiate a vertical section of the wall of said well,
   vertically elongated transducer means on said sonde spaced from said source and adapted to receive and convert to corresponding electrical-wave energy, the sonic-wave energy returning thereto from said irradiated wall section,
   said sonde being in two parts relatively rotatable with the well axis as a center, and including
   means for rotating the part carrying said source and transducer means about said axis, said rotating part including sonic-energy insulating and directing means which restrict the direction from which said sonic energy returns from said irradiated wall section to said transducer means,
   means to maintain a fluid pressure within said insulating and directing means in substantial balance with the external well-fluid pressure at varying depths in a well,
   electrical conductor and support means extending between said sonde and recording means at the ground surface for moving said sonde through said well,
   means in said sonde for transmitting along said conductor means to said recording means signals derived from said transducer means representing the relative amplitude and phase variations of said received sonic-wave energy over the area of said transducing means, and
   means for recording said signals in correlation with the position of said irradiated wall section in said well.

2. Apparatus as in claim 1 including also means in said rotating part for producing an electrical signal of azimuth relative to the nonrotating part of said sonde.

* * * * *

PO-1050
(5/69)

UNITED STATES PATENT OFFICE
CERTIFICATE OF CORRECTION

Patent No. 3,631,385        Dated December 28, 1971

Inventor(s) Daniel Silverman

It is certified that error appears in the above-identified patent and that said Letters Patent are hereby corrected as shown below:

Column 5, line 40, "tuber" should be -- tube --.
Column 6, line 4, "enough" should be -- 95 --;
" ", " 7, "mixer" should be -- of --;
" ", " 18, "use" should be -- used --.
Add the following claim:
    3. Apparatus as in claim 1 in which said transducing means is an array of individual transducers and said transmitting means includes
    multiplexing switch means for sampling the outputs of all of said individual transducers in succession during a time interval less than the time of rotation of said part through an angle equal to that subtended at the well axis by the smallest wall feature that is to be observed.

Signed and sealed this 13th day of June 1972.

(SEAL)
Attest:

EDWARD M. FLETCHER, JR.
Attesting Officer

ROBERT GOTTSCHALK
Commissioner of Patents